(12) United States Patent
Gagliardi, Jr.

(10) Patent No.: US 6,428,838 B1
(45) Date of Patent: Aug. 6, 2002

(54) METHOD FOR MAKING A FOOD PRODUCT FROM THE THIGH OF A BIRD OR OTHER ANIMAL AND A FOOD PRODUCT RESULTING THEREFROM

(75) Inventor: Eugene D. Gagliardi, Jr., Atglen, PA (US)

(73) Assignee: Visionary Design, Inc., Atglen, PA (US)

(*) Notice: Subject to any disclaimer, the term of this patent is extended or adjusted under 35 U.S.C. 154(b) by 0 days.

(21) Appl. No.: 09/606,949

(22) Filed: Jun. 30, 2000

Related U.S. Application Data

(60) Provisional application No. 60/141,736, filed on Jun. 30, 1999.

(51) Int. Cl.[7] ............................................... A22C 21/00
(52) U.S. Cl. ........................................ 426/644; 426/518
(58) Field of Search ................................ 426/644, 518, 426/134; 452/136, 166

(56) References Cited

U.S. PATENT DOCUMENTS

| | | | |
|---|---|---|---|
| 1,778,485 A | * | 10/1930 | Davidson |
| 2,116,310 A | * | 5/1938 | Harvey |
| 3,300,317 A | * | 1/1967 | Franklin |
| 3,615,692 A | * | 10/1971 | Lovell .......................... 99/107 |
| 3,717,473 A | * | 2/1973 | Bissett ......................... 99/107 |
| 4,938,988 A | * | 7/1990 | Fankhauser ................. 426/644 |
| 5,250,309 A | * | 10/1993 | Gagliardi ..................... 426/104 |
| 5,266,064 A | | 11/1993 | Gagliardi, Jr. |
| 5,273,483 A | * | 12/1993 | Gagliardi ..................... 452/135 |
| 5,284,669 A | * | 2/1994 | Gagliardi ..................... 426/480 |
| 5,297,984 A | | 3/1994 | Gagliardi, Jr. |
| 5,314,374 A | | 5/1994 | Koch et al. |
| 5,368,519 A | * | 11/1994 | Curtis .......................... 452/135 |
| 5,442,999 A | * | 8/1995 | Meister ........................ 99/426 |
| 5,932,278 A | | 8/1999 | Gagliardi, Jr. |
| 6,200,614 B1 | * | 3/2001 | Brawley ...................... 426/134 |

FOREIGN PATENT DOCUMENTS

| | | | | |
|---|---|---|---|---|
| EP | 220748 | * | 3/1986 | |
| FR | 2566629 | * | 6/1984 | .................. 426/644 |
| FR | 2618999 | * | 8/1987 | |
| JP | 11308962 | * | 4/1998 | |

OTHER PUBLICATIONS

Olney 1983 Outdoor Cooking Time–Life Books Alexandria, VA pp. 54–55.*
Anon 1993 Food Trade Review 63(12) 764 (Abstract Only).*
Anon 1993 Food Manufacture 68(11) p. 50.*

* cited by examiner

*Primary Examiner*—Carolyn Paden
(74) *Attorney, Agent, or Firm*—Akin, Gump, Strauss, Hauer & Feld, L.L.P.

(57) ABSTRACT

A method of making a food product including: selecting a thigh of an animal, the thigh comprising a thigh bone at least partially surrounded with thigh meat, the thigh bone having a first end and a second end; and partially deboning the thigh causing the first end of the thigh bone to extend from the thigh meat to form a handle for holding the food product, the thigh meat being generally positioned proximate to the second end of the thigh bone after the partial deboning. A fun to eat food product is also detailed herein. The fun to eat food product is formed from an animal's thigh, including a thigh bone having a first end and a second end. Thigh meat having an overall generally elongated shape extends from the second end of the thigh bone and is generally secured thereto. A handle is formed by the first end of the thigh bone extending from the thigh meat.

21 Claims, 3 Drawing Sheets

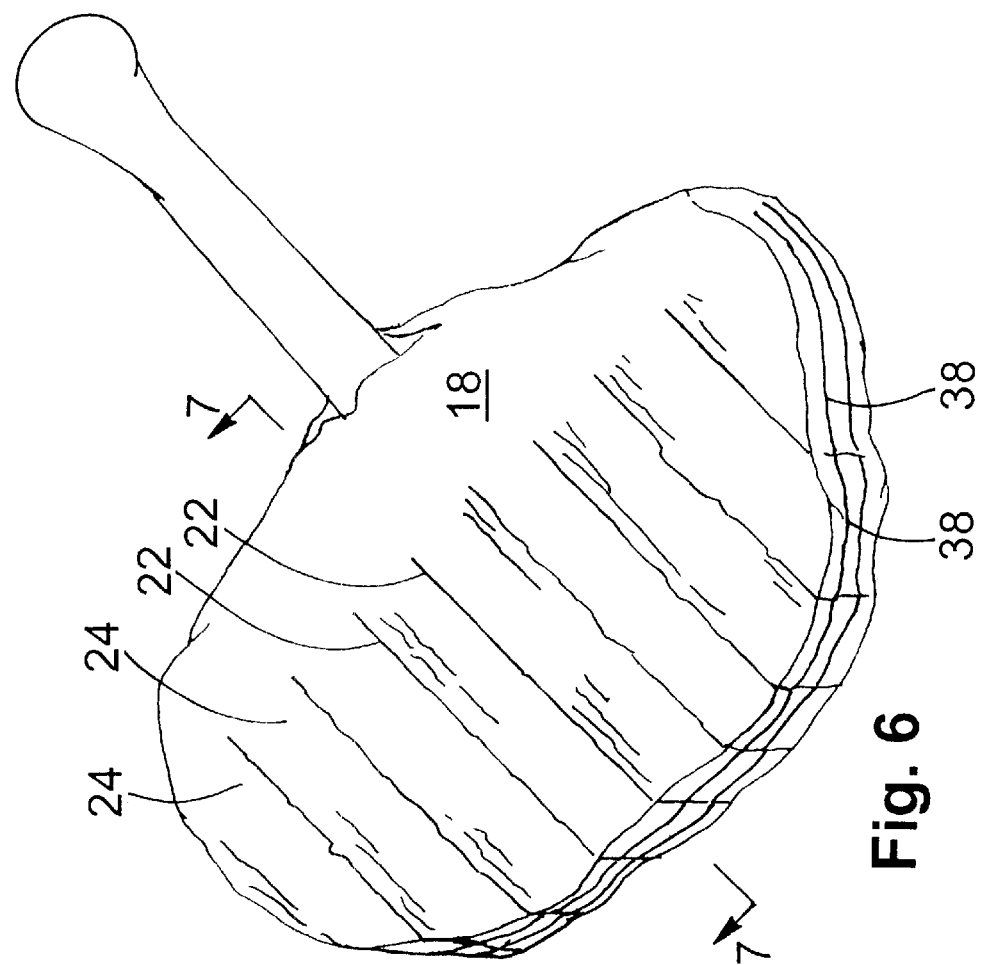
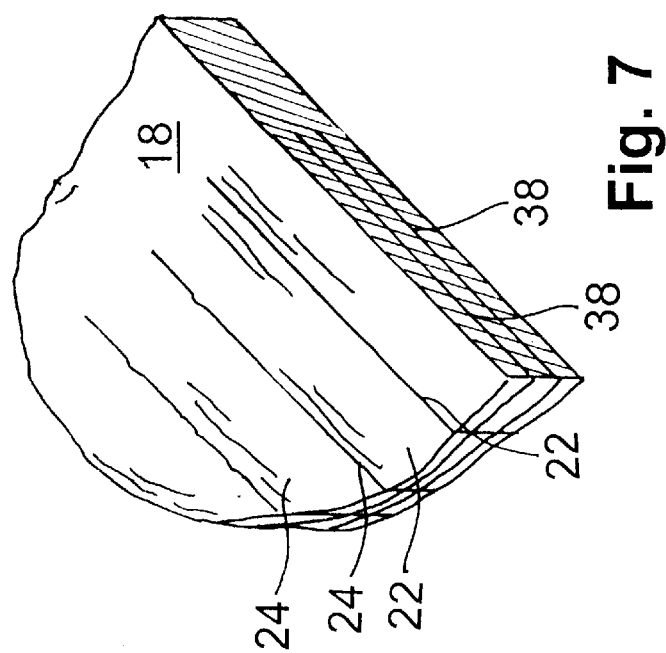

METHOD FOR MAKING A FOOD PRODUCT FROM THE THIGH OF A BIRD OR OTHER ANIMAL AND A FOOD PRODUCT RESULTING THEREFROM

CROSS REFERENCE TO RELATED APPLICATIONS

The present application claims priority under 35 U.S.C. §120 from U.S. Provisional Patent Application No. 60/141,736, entitled "Method for Making a Food Product From the Thigh of a Bird or Other Animal and a Food Product Resulting Therefrom," filed Jun. 30, 1999 which is hereby incorporated by reference herein in its entirety.

BACKGROUND OF THE INVENTION

The present invention relates to a method of making a food product from the thigh of a bird or other animal, as well as to the food product produced thereby and, more specifically, to such a food product which is partially deboned to form a handle for easy handling of the food product.

Birds, such as poultry and fowl, are conventionally eviscerated, dressed and sold either as a whole bird or as separate parts, i.e., breasts, thighs, wings, etc. One of the parts which is often separated and sold is the upper portion of the bird leg, generally referred to as the thigh. Typically thighs are sold with the skin in place and with thigh meat surrounding an elongated bone that extends generally from one end of the thigh meat to the other.

In recent years, there has been an increasing demand for innovative meat products, particularly products which require less time for preparation and which include little or no waste. There has also been an increasing demand for meat products which are boneless or relatively boneless, making such products easier to consume. Hence, products such as boneless chicken breasts, chicken tenders, etc., have enjoyed tremendous commercial success. Other innovative products such as "hot wings," "buffalo wings," etc., have also obtained enhanced popularity for the respective cuts from which they are prepared.

Until recently, some bird parts, such as thighs, have not been particularly amenable to such enhanced commercial processing and preparation methods for a variety of reasons primarily related to the type of meat (dark vs. light), the size of the thigh meat, the centralized location of the bone, etc.

One example of making a food product using the thigh of a bird is shown in U.S. Pat. No. 5,266,064 and is herein incorporated by reference in its entirety. To generate the food product from bird thighs, the side lobes of the thigh meat are removed. The removal of the side lobes results in a more convenient and fun to eat food product. However, the food product that results still has a bone present throughout a substantial portion of the thigh meat.

U.S. Pat. No. 5,297,984 discloses a method of making a food product from a drumstick of a bird or other animal and is incorporated by reference herein in its entirety. The food product manufactured from the drumstick removes a portion of the drumstick and its bone to allow one to eat the drumstick meat without having to worry about biting down on a bone. While this food product works well with drumsticks, the lack of a suitable handle would prevent the use of the method with thigh cuts of meat.

What is needed, but so far not provided by the conventional art, is a fun to eat food product that is partially deboned to form a handle that increases the convenience with which thigh meat is consumed, that can be sliced to create convenient sections of meat that can be individually separated for easy and convenient consumption, and that can be dipped in batter, breaded, and then baked or deep fried. A method of making such a fun to eat food product is also not provided by the conventional art.

SUMMARY OF THE INVENTION

One embodiment of the present invention is directed to a method of making a food product including the steps of: selecting a thigh of an animal, the thigh comprising a thigh bone at least partially surrounded with thigh meat, the thigh bone having a first end and a second end; and partially deboning the thigh causing the first end of the thigh bone to extend from the thigh meat to form a handle for holding the food product, the thigh meat being generally positioned proximate to the second end of the thigh bone after the partial deboning.

The present invention is alternatively directed to a fun to eat food product formed from an animal's thigh, including a thigh bone having a first end and a second end. Thigh meat has an overall generally elongated shape and extends from the second end of the thigh bone and is generally secured thereto. A handle is formed by the first end of the thigh bone extending from the thigh meat.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 6 is a perspective view of the thigh cut of FIG. 5 illustrating a second plurality of cuts; and FIG. 7 is a perspective cross-sectional view of the thigh cut of FIG. 6 as taken along the line 7—7 of FIG. 6.

DETAILED DESCRIPTION OF THE INVENTION

Figure 3:
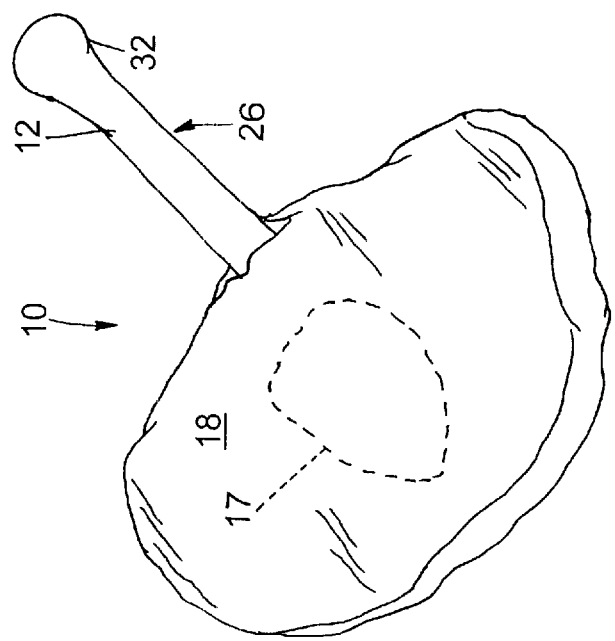
FIG. 3 is a perspective view the thigh cut of FIG. 1 partially deboned to form a first embodiment of a food product according to the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the food product and designated parts thereof. The terminology includes the words above specifically mentioned, derivatives thereof and words of similar import. The word "a," as used in the claims and in the corresponding portions of the specification, means "at least one." Additionally, the use of the word "bird" in the specification should be understood to mean "any type of animal."

Figure 2:
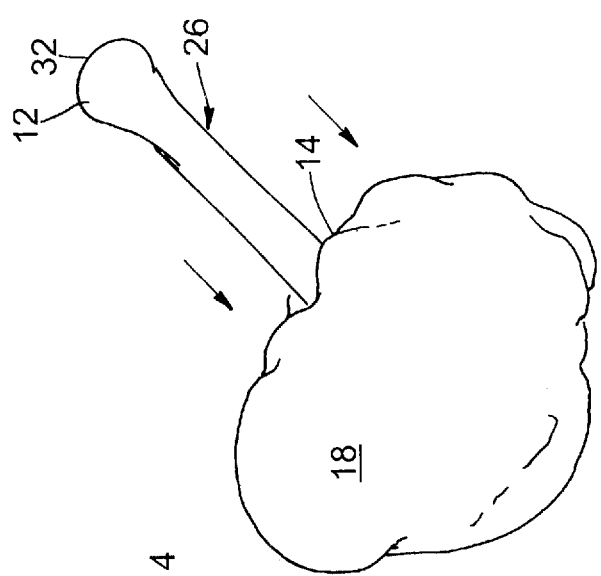
FIG. 2 is a perspective view of the thigh cut of FIG. 1 in the process of being partially deboned.
Figure 1:
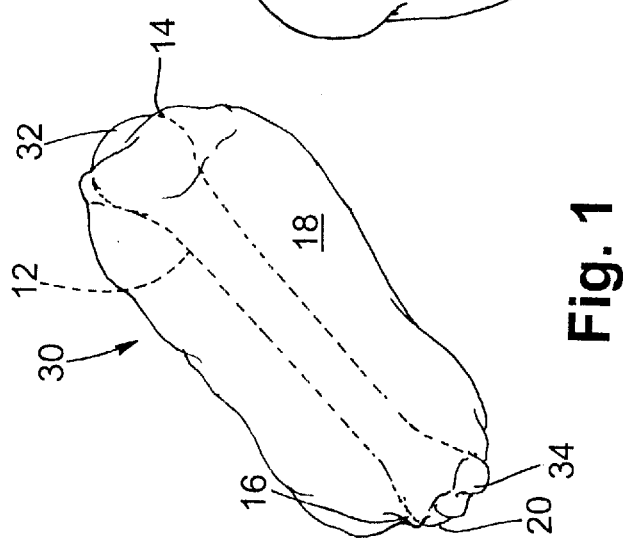
FIG. 1 is a perspective view of a typical thigh cut of butchered meat, such as chicken.
Figure 4:
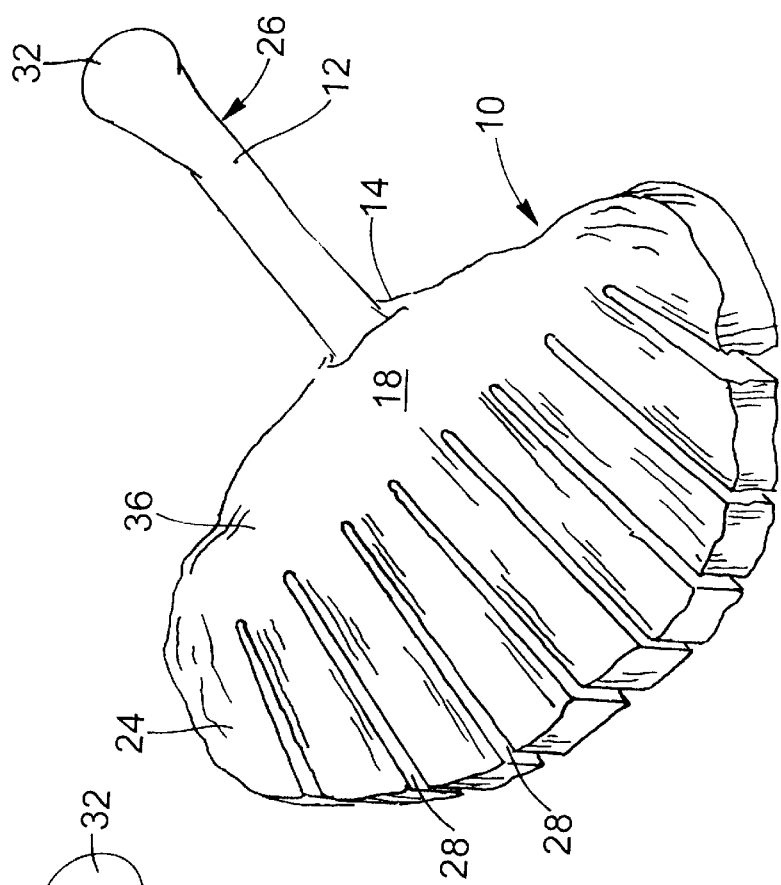
FIG. 4 is a perspective view of the thigh cut of FIG. 3 with cuts made through the thigh meat.

Referring to the drawings in detail, wherein like numerals indicate like elements throughout, there is shown in FIGS. 1–7 preferred embodiments of a food product, generally designated 10. Illustrations representing the steps in manufacturing the first embodiment of a food product 10 according to the present invention are shown in FIGS. 1–3. Illustrations representing the steps in manufacturing a second embodiment of a food product 10 are shown in FIGS. 1–5. FIGS. 6 and 7 the second embodiment of the food product 10 with an additional set of cuts (further described below).

Briefly stated, the fun to eat food product 10 of the present invention is formed from an animal's thigh 30 including a thigh bone 12 having a first end 32 and a second end 34. Thigh meat 18 having an overall generally elongated shape extends from the second end 34 of the thigh bone 12 and is generally secured thereto. A handle 26 is formed by the first end 32 of the thigh bone 12 extending from the thigh meat 18. It is preferable, but not necessary, that the thigh meat 18 has an uncut portion 36 generally secured to the thigh bone 12 with a plurality of sections 24 of thigh meat 30 extending from the uncut portion 36.

Both embodiments use a typical thigh cut 30 of a bird, preferably fowl or poultry, to manufacture the food product 10. The thigh cut 30 is of a type which is generally well known in the art and includes a first end 32 which, prior to butchering, had been connected to the hip (not shown) of a bird, and a second end 34 which, prior to butchering, had been connected to the lower leg, or drumstick (not shown) of a bird.

The thigh cut 30 further includes an elongated bone 12 extending substantially the entire length of the thigh 30 from one end 14 of the thigh meat 18 to the other end 16 of the thigh meat 18 in a manner well known in the art. The bone 12 is substantially surrounded by the thigh meat 18 in a manner which is also well known in the art.

In general, the thigh meat 18 of the thigh cut 30 is considered to be "dark meat" and is characterized as being moister and more flavorful than meat from other parts of a bird. The meat 18 extends generally irregularly radially outwardly from the bone 12 to a predetermined variable diameter. The thickness of the meat 18 tapers slightly inwardly from one end 14 of the thigh meat 18 toward the other end 16 of the thigh meat 18. The thickness of the meat 18 that extends along the axial length of the bone 12 will vary depending upon the type of bird and the weight or size of the bird from which the thigh 30 comes.

In general, the thigh meat 18 is surrounded by a covering of skin (not shown) as is well known to those skilled in the art. The first end 32 and the second end 34 of the bone 12 may include some fat, gristle or cartilage (not shown). The skin and the fat, gristle and cartilage are not pertinent to the present invention and therefore, will not hereinafter be discussed.

The thigh cut 30 as thus far described and as shown in FIG. 1 is typical of the type of thigh cut 30 commonly available from a butcher, a supermarket, etc. The overall length and/or width and thickness of the thigh cut 30 and the bone 12 may vary greatly depending upon the type of fowl or poultry and depending upon other factors including the age and weight of the bird from which the thigh cut 30 comes. In addition, the toughness, and other properties, of the meat 18 on the thigh cut 30 will vary depending on the type of fowl or poultry, etc. It will be appreciated by those skilled in the art that the size of the thigh 30 as well as the amount or thickness of the thigh meat 18 does not matter to the present invention which is equally applicable to any size of thigh cut 30 or any amount of attached meat.

While the preferred embodiments for manufacturing the food product 10 preferably use the thigh cut 30 of a bird, those of skill in the art will appreciate that the food product 10 of the present invention is not limited to thigh cuts 30 from birds. For example, the food product 10 of the present invention can be prepared using the thighs of pigs, deer, or calves. It will also be appreciated by those skilled in the art that the present invention is equally applicable to any type of bird, including fowl, poultry, etc., as well as the other types of animal legs or limbs.

One embodiment of the present invention comprises a method of making a partially deboned food product 10 from a thigh 30 of a bird of the type described above. FIGS. 2–5 illustrate a partially deboned thigh cut 30 in accordance with the preferred embodiments of the present invention.

The method of making a food product 10 includes selecting a thigh 30 of an animal, the thigh 30 comprising a thigh bone 12 at least partially surrounded with thigh meat 18, the thigh bone 12 having a first end 32 and a second end 34. The method of the present invention includes partially deboning the thigh 30 causing the first end 32 of the thigh bone 12 to extend from the thigh meat 18 to form a handle 26 for holding the food product 10, the thigh meat 18 being generally positioned proximate to the second end 34 of the thigh bone 12 after the partial deboning.

As can be seen in FIGS. 2–5, a portion of the bone 12 that is proximate to the first end 32 extends outwardly from one end 14 of the thigh meat 18 to form a handle 26. Thus, the food product 10 is substantially boneless throughout the thigh meat 18 thereby facilitating consumption without having to be concerned about eating around the bone 12. The second end 34 of the bone 12 remains inside of and attached to the thigh meat 18 to allow the handle 26 to be used to lift the food product 10.

Referring to FIGS. 1–3, a first embodiment of the food product 10 according to the present invention is prepared as follows. A typical thigh cut 30 is produced by butchering an animal. The thigh cut 30 has a bone 12 that generally extends from one side 14 of the thigh meat 18 through to the other side 16 of the thigh meat 18.

During the partial deboning of the thigh cut 30, the thigh meat 18 is compressed as shown in FIG. 2. The thigh meat 18 is partially deboned which results in the bone 12 protruding largely from one side 14 of the thigh meat 18 to form a handle 26 that is preferably used to hold the food product 10 during consumption. The first end 32 of the bone 12 makes the handle 26 easier to grasp. The handle 26 also facilitates the dipping of the food product 10 into a variety of dipping sauces (not shown).

The second end (or the knee joint) 34 of the bone 12 remains in and connected to the thigh meat 18 to allow the thigh meat 18 to be picked up and eaten in a manner similar to that of a Frenched Chop. After the bone 12 is extended to the desired distance from the one side 14 of the thigh meat 18, the thigh meat 18 is allowed to decompress as shown in FIG. 3.

The particular method of partially deboning the typical thigh cut 30 is not pertinent to the present invention. When partially deboning the thigh 30, it is preferred that the thigh meat 18 is generally displaced away from the end of the bone 12 that connects to the hip of the animal (i.e., the first end 32 of the bone 12) and is displaced toward the end of the bone 12 that connects to the lower leg (i.e., the second end 34 of the bone 12). The process for partially deboning a typical thigh cut 30 to produce the food product 10 would be obvious to one of ordinary skill in the art when considered in combination with this disclosure. Accordingly, further details as to the process of partially deboning the thigh cut 30 are neither necessary nor limiting.

Referring to FIG. 3, the finished food product 10 according to the first embodiment of the present invention can be marinated using various sauces (not shown) depending on a consumer's taste and preferences. Additionally, the method of the present invention preferably, but not necessarily, includes cooking the food product 10 by any one of baking, broiling, steaming, microwave cooking, grilling, and deep frying. Furthermore, the method of the present invention may, but does not necessarily, include removing at least a portion of skin from the thigh 30.

In preparing the food product 10, the method of the present invention may, but does not necessarily, include marinating the food product 10 for a predetermined period of time. Depending on desired food product 10, the method of the present invention may, but does not necessarily, include applying a coat of batter to the food product 10. In addition to the thin coating of batter, the method of the present invention may, but does not necessarily, include applying a layer of breading to the food product 10. Then, the food product 10, along with the batter coating and the layer of breading, can be further prepared for consumption.

The method of the present invention preferably, but not necessarily, includes at least partially cooking the food product 10. The method of the present invention may, but does not necessarily include, freezing the food product 10 for conveying the food product 10 to a recipient. Additionally, the method of the present invention may, but does not necessarily, include receiving the food product 10 and finish cooking the food product 10 by deep frying the food product 10. Accordingly, the fun to eat food product 10 can be either uncooked, fully cooked, or partially cooked and frozen to allow for shipping to distributors. When partially cooked and frozen food products 10 are received by retailers, the food product can be quickly deep fried to both thaw the food product 10 and to complete the cooking process.

Referring to FIGS. 1–5, a method of preparing a second embodiment of the food product 10 according to the present invention is as follows. Similar to the method for preparing the above-described first embodiment, the method of manufacturing the second embodiment of the food product 10 starts with a typical thigh cut 30. The bone 12 extends through the thigh meat 18 from one end 14 to the other end 16 of the thigh meat 18. Referring to FIG. 2, the thigh meat 18 is partially deboned causing the bone 12 to protrude from one end 14 of the thigh meat 18 to form a handle 26. During the partial deboning process, the thigh meat 18 is compressed.

Once the bone 12 is extended to the desired length to form the handle 26, the thigh meat 18 is allowed to decompress as shown in FIG. 3. The first end 32 of the bone 12 makes the handle 26 easier to grasp without slipping.

The method of forming a fun to eat food product 10 according to the second embodiment of the present invention preferably includes forming a plurality of cuts in the thigh meat 18, the plurality of cuts forming a plurality of sections 24 of thigh meat 18 extending from an uncut portion 36 of the thigh meat 18 which is generally secured to the second end 34 of the thigh bone 12, the plurality of sections 24 simplifying the removal of individual portions of the thigh meat 18 from the thigh 30. Thus, once the thigh meat 18 has been partially deboned to form the desired handle 26, it is preferable, but not necessary, that a first plurality of cuts 22 are made in the thigh meat 18. It is preferable, but not necessary, that the method of the second embodiment include forming a plurality of cuts in the thigh meat 18 that are generally parallel to each other. The method of the second embodiment may, but does not necessarily, include forming a plurality of cuts extending across the lateral width of the thigh meat 18. Alternatively, the method of the second embodiment may, but does not necessarily, include forming a plurality of cuts wherein the spacing between each adjacent one of the plurality of cuts, increases throughout the thigh meat 18.

The first plurality of cuts 22 extend from the other end 16 of the thigh meat 18 toward the one end 14 of the thigh meat 18. The first plurality of cuts 22 are preferably, but not necessarily, aligned in a somewhat parallel fashion to the handle 26 and terminate prior to reaching the one end 14 of the thigh meat 18. This results in an uncut portion 36 being formed in the thigh meat 18 proximate to the handle 26.

While the first set of cuts 22 are preferably somewhat perpendicular to the uncut portion 36 of the thigh meat 18, those of skill in the art will appreciate from this disclosure that the food product 10 is not limited to a first set of cuts 22 that are somewhat perpendicular to the uncut portion 36. For instance, the first set of cuts 22 could be angled relative to the handle 26 to create sections 24 that are not somewhat perpendicular to the uncut portion 36.

Figure 5:
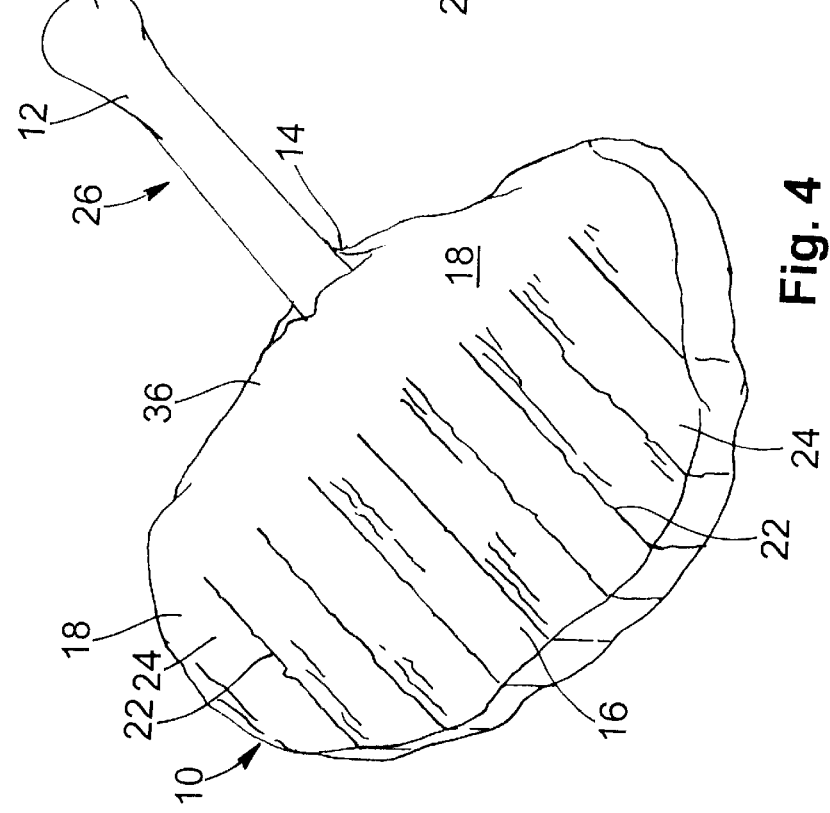
FIG. 5 is a perspective view of the thigh cut of FIG. 4 after at least partially cooking the thigh cut to form a second embodiment of a food product according to the present invention.

As shown in FIG. 5 (which shows the food product 10 of FIG. 4 as at least partially cooked), the first plurality of cuts 22 in the thigh meat 18 form sections 24 that extend substantially the entire width of the thigh meat 18. While the sections 24 are preferable evenly sized, it is understood by those of skill in the art from this disclosure that the width of the sections 24 can be varied without departing from the scope of the present invention. For example, the sections 24 could gradually increase in width as one moves from the left side toward the right side of the thigh meat 18.

Alternatively, as shown in FIGS. 6 and 7, the second embodiment of a method of making a fun to eat food product 10 may, but does not necessarily, include forming a first plurality of cuts 22 in the thigh meat 18 that are generally parallel to each other and forming a second plurality of cuts 24 in the thigh meat 18 that are generally parallel to each other. Thus, a second plurality of cuts 38 may be formed in a generally perpendicular orientation relative to the first plurality of cuts 22 to form smaller sections 24. Similar to the first plurality of cuts 22, the second plurality of cuts 38 extend from the other end 16 of the thigh meat 18 to the uncut portion 36 of the thigh meat 18. The use of second plurality of cuts 38 results in a reduced likelihood of the food product 10 causing choking due to the reduced diameter of the thigh meat 18 that a person must bite through to separate a portion of the thigh meat 18 from the food product 10.

Referring to FIG. 7, the second embodiment of forming a fun to eat food product preferably, but not necessarily, includes forming the second plurality of cuts 24 generally perpendicular to the first plurality of cuts 22. While the use of the second plurality of cuts 38 preferably forms sections that are rectangular in shape, those of skill in the art will understand from this disclosure that the present invention is not limited to a second plurality of cuts 38 that form sections 24 having a particular shape. Accordingly, the second embodiment of the method may, but does not necessarily, include forming a plurality of cuts wherein the second plurality of cuts 24 are generally askew to the first plurality of cuts 22. This allows the second plurality of cuts 24 to be used to form parallelograms in the thigh meat 18.

It is preferable, but not necessary, that the second embodiment of the method for making a fun to eat food product 10 include forming a plurality of cuts wherein the first plurality of cuts 22 and the second plurality of cuts 24 extend across a width of the thigh meat 18. Those of skill in the art will also appreciate from this disclosure that the sections 24 formed with both a first and second plurality of cuts 22, 38 can be of varying size. After the appropriate first and second sets of cuts 22, 38 have been made in the thigh meat 18, the food product 10 can be marinated in various sauces (not shown) prior to baking or deep frying.

While a second embodiment of the food product 10 has been discussed as having either one or two sets of pluralities of cuts, it is understood by those of skill in the art that any number of sets of cuts can be used to form any patterns desired by a manufacturer of the food product 10. As such, the second embodiment of the method of the present invention may, but does not necessarily, include forming a generally central elongated portion generally having a star-shape, when viewed in cross-section, and forming a plurality of sections substantially surrounding the central elongated portion. It is also understood that the first and second sets of cuts 22, 38 do not have to extend across the full width of the thigh meat 18. For example, a food product 10 can be produced where a central portion of the thigh meat 18 is star-shaped and a plurality of smaller sections surround the star-shaped portion.

Referring to FIG. 5, the food product 10 can be baked or fried depending upon the manufacturer's preference. When the food product 10 is cooked, the plurality of sections 24 formed by the first and second sets of cuts 22, 38 preferably separate to form a plurality of gaps 28 between the sections 24. The separation of the sections 24 of the food product 10 simplifies consumption of the food product 10 and allows consumers to more easily remove individual sections 24.

A third embodiment of the method for making a fun to eat food product 10 preferably, but not necessarily, includes depositing a filling inside of a cavity 17 (the cavity 17 is shown in phantom lines in FIG. 3) in the thigh meat 18 resulting from the partial deboning. Depending on the size of the thigh 30 used with the method of the present invention, the addition of a filling inside of the thigh can result in an even more exciting and festive food product. For example, when consuming turkey or calve thighs, a filling can be deposited in the cavity which complements the flavor of the thigh meat 18. Those of ordinary skill in the art will understand from this disclosure that any size thigh 30 can be combined with a filling without departing from the scope of the present invention.

The step of depositing a filling preferably, but not necessarily, includes depositing a filling consisting of any one of a bread stuffing, a shrimp mixture, a hot dog mixture, a pizza mixture, a cheese filling and a beef mixture inside the cavity. The filling may be uncooked, partially cooked or fully cooked prior to depositing in the cavity of the thigh meat 18. Depending on the type of filling, it may be preferable to fully cook the filling and partially cook the thigh meat 18 before insertion of the filling into the thigh meat 18. This allows the thigh meat 18 to be fully cooked with a finish cooking step which results in the warming up of the filling.

Thin coatings of batter and layers of breading can be applied to the food product 10 prior to deep frying. For example, a thin layer of batter may be preferably applied along the surface of the sections 24 of the thigh meat 18. After the thin coating of batter is applied, a layer of breading may be placed on the food product 10. Then, the food product 10 is either fully cooked for immediate consumption or mostly cooked for freezing and subsequent finish cooking by a retailer.

It is recognized by those skilled in the art that the present invention can be carried out manually, or by any suitable automatic cutting apparatus, as would be well known to those of skill in the art when considered in combination with this disclosure. For ease of cutting the thigh cut 30, it is preferable that the thigh cut 30 be chilled prior to cutting to facilitate the cutting process.

From the foregoing description, it can be seen that the present invention comprises a new and unique method of producing a food product 10 using a thigh cut 30 and further comprises the food product 10 manufactured therefrom. The method is quick and easy to utilize and the resulting food product 10 is both appetizing and convenient for the consumer to handle. It will be recognized by those skilled in the art that changes could be made to the above-described embodiments of the present invention without departing from the broad inventive concepts thereof. It is understood, therefore, that this invention is not limited to the particular embodiments disclosed, but it is intended to cover any modifications which are within the spirit and scope of the present invention as defined by the appended claims.

I claim:

1. A method of making a food product, comprising:

selecting a thigh of an animal, the thigh comprising a thigh bone at least partially surrounded with thigh meat, the thigh bone having a first end and a second end;

partially deboning the thigh causing the first end of the thigh bone to extend from the thigh meat to form a handle for holding the food product, the thigh meat being generally positioned proximate to the second end of the thigh bone after the partial deboning; and forming a plurality of cuts in the thigh meat, the plurality of cuts forming a plurality of sections of thigh meat extending from an uncut portion of the thigh meat which is generally secured to the second end of the thigh bone, the plurality of sections simplifying the removal of individual portions of the thigh meat from the thigh.

2. The method of claim 1, wherein the step of forming a plurality of cuts comprises forming a plurality of cuts in the thigh meat that are generally parallel to each other.

3. The method of claim 2, wherein the forming of a plurality of cuts comprises forming a plurality of cuts in the thigh meat that are generally evenly spaced from each other.

4. The method of claim 3, wherein the forming of a plurality of cuts comprises forming a plurality of cuts extending across a lateral width of the thigh meat.

5. The method of claim 2, wherein the forming of a plurality of cuts comprises forming a plurality of cuts wherein a spacing between each adjacent one of the plurality of cuts, as measured perpendicularly to the plurality of cuts, increases throughout the thigh meat.

6. The method of claim 2, further comprising applying a coat of batter to the food product.

7. The method of claim 6, further comprising applying a layer of breading to the food product.

8. The method of claim 7, further comprising at least partially cooking the food product.

9. The method of claim 8, further comprising freezing the food product for conveying the food product to a recipient.

10. The method of claim 9, further comprising receiving the food product and finish cooking the food product by deep frying the food product.

11. The method of claim 7, further comprising depositing a filling inside a cavity in the thigh meat resulting from the partial deboning.

12. The method of claim 11, wherein the depositing of a filling comprises depositing any one of a group consisting of a bread stuffing, a shrimp mixture, a hot dog mixture, a pizza mixture, a cheese filling and a beef mixture inside the cavity.

13. The food product of claim 11, wherein the thigh meat has an uncut portion generally secured to the thigh bone with a plurality of sections of thighmeat extending from the uncut portion.

14. The method of claim 1, wherein the step of forming a plurality of cuts comprises:

forming a first plurality of cuts in the thigh meat that are generally parallel to each other; and forming a second plurality of cuts in the thigh meat that are generally parallel to each other.

15. The method of claim 14, wherein the forming of a plurality of cuts comprises forming the second plurality of cuts generally perpendicular to the first plurality of cuts.

16. The method of claim 15, wherein the forming of a plurality of cuts includes the first plurality of cuts and the second plurality of cuts extending across a width of the thigh meat.

17. The method of claim 14, wherein the forming of a plurality of cuts comprises forming the second plurality of cuts generally askew to the first plurality of cuts.

18. The method of claim 14, further comprising cooking the food product by any one of baking, broiling, steaming, microwave cooking, grilling, and deep frying.

19. The method of claim 18, further including removing at least a portion of skin from the thigh.

20. The method of claim 18, further including marinating the food product for a predetermined period of time.

21. The method of claim 1, wherein the forming of a plurality of cuts comprises forming a generally central elongated portion generally having a starshape, when viewed in cross-section, and forming a plurality of sections partially surrounding the central elongated portion.

* * * * *